US 8,510,673 B2

(12) United States Patent
Sauve et al.

(10) Patent No.: US 8,510,673 B2
(45) Date of Patent: *Aug. 13, 2013

(54) SYSTEM AND METHOD FOR PINNING TABS IN A TABBED BROWSER

(75) Inventors: Aaron J. Sauve, Seattle, WA (US); Charles Cummins, Seattle, WA (US); Cornelis K. Van Dok, Bellevue, WA (US); Tony E. Schreiner, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/048,528

(22) Filed: Mar. 15, 2011

(65) Prior Publication Data

US 2011/0167376 A1  Jul. 7, 2011

Related U.S. Application Data

(63) Continuation of application No. 11/090,929, filed on Mar. 25, 2005, now Pat. No. 7,921,372.

(51) Int. Cl.
*G06F 9/00* (2006.01)
(52) U.S. Cl.
USPC ........... 715/777; 715/764; 715/802; 715/804; 715/767; 715/792; 715/781
(58) Field of Classification Search
USPC ........................................................ 715/777
See application file for complete search history.

(56) References Cited

U.S. PATENT DOCUMENTS

| 5,072,412 | A | 12/1991 | Henderson, Jr. et al. |
| 5,933,142 | A | 8/1999 | LaStrange et al. |
| 5,949,413 | A | 9/1999 | Lerissa et al. |
| 6,025,844 | A | 2/2000 | Parsons |
| 6,101,510 | A | 8/2000 | Stone et al. |
| 6,247,020 | B1 | 6/2001 | Minard |
| 6,359,634 | B1 | 3/2002 | Cragun et al. |
| 6,433,801 | B1 | 8/2002 | Moon et al. |
| 6,456,303 | B1 | 9/2002 | Walden et al. |

(Continued)

FOREIGN PATENT DOCUMENTS

GB  2360921  10/2001

OTHER PUBLICATIONS

"More Like This Patent Application US 20110167376", retrieved on Jul. 13, 2012, at <<http://www.ip.com/morelike.html>>, pp. 4.*

(Continued)

*Primary Examiner* — Tadeese Hailu
*Assistant Examiner* — Darrin Hope
(74) *Attorney, Agent, or Firm* — Lee & Hayes, PLLC

(57) ABSTRACT

The techniques and mechanisms described herein are directed to a method for pinning a tab in a tabbed browser. Briefly stated, browsing software is configured to recognize a "pin" event, such as a hot key, a menu selection, and the like. Upon recognizing the pin event, the browsing software splits a display screen into a pinned window and a tabbed window. The tabbed window displays one or more open tabs and the content of the currently in focus tab. The pinned window may display content that was previously displayed within one of the tabs in the tabbed window or may display new content. The browsing software may configure the navigation of the pinned window differently than the navigation for the tabs in the tabbed window.

20 Claims, 8 Drawing Sheets

(56) References Cited

U.S. PATENT DOCUMENTS

| | | | |
|---|---|---|---|
| 6,489,975 | B1 | 12/2002 | Patil et al. |
| 6,801,227 | B2 | 10/2004 | Bocionek et al. |
| 7,325,204 | B2 | 1/2008 | Rogers |
| 2003/0071849 | A1 | 4/2003 | Ferri |
| 2004/0093562 | A1 | 5/2004 | Diorio et al. |
| 2004/0215649 | A1 | 10/2004 | Whalen et al. |
| 2005/0015726 | A1 | 1/2005 | Tuominen |
| 2005/0240864 | A1 | 10/2005 | Leetaru et al. |
| 2006/0080292 | A1 | 4/2006 | Alanzi |

OTHER PUBLICATIONS

"Maxthon Tabbed Browser," found on internet at http://www.maxthon.com/ on Jan. 25, 2006, 3 pages.

"Netscape 7.1 Highlights", Copyright 2003, Netscape Communications Corporation, Jun. 27, 2003, 46 pages, found on internet at http://channels.netscape.com/browsers/7/learnmore/NS71_reviewersguide.pdf.

"Opera for Windows," found on internet at http://www.opera.com/products/desktop/ on Jan. 25, 2006, 4 pages.

"Tabbrowser Preferences—Firefox Extension," found on internet at https://addons.mozilla.org/extensions/moreinfo.php?id=158&application=firefox on Jan. 25, 2006, 3 pages.

"WYMEA Bay-iRider", retrieved on Oct. 23, 2007, at <<http://web.archive.org/web/20040717053509/www.irider.com/irider/index.htm>>, pp. 9.

* cited by examiner

SYSTEM AND METHOD FOR PINNING TABS IN A TABBED BROWSER

CROSS REFERENCE TO RELATE APPLICATION

This application is a continuation of U.S. patent application Ser. No. 11/090,929 entitled "System and Method for Pinning Tabs in a Tabbed Browser," filed on Mar. 25, 2005, which is incorporated herein by reference.

TECHNICAL FIELD

This document generally relates to browsing software, and more particularly, to tabbed-browsing software.

BACKGROUND

Browsing the World Wide Web (the web), the graphical portion of the Internet, has become quite popular in recent years. A software program, commonly referred to as a web browser, or just browser, provides an easy-to-use point-and-click interface for accessing various content on the web. Upon entering a web address or URL of a particular website, the browser requests web pages from a web server hosting that website. The browser then interprets the web pages and displays the content on a display. The web pages include hypertext and hyperlinks that, when selected, cause the browser to request additional content associated with them. By selecting the hypertext and hyperlinks, a user may conveniently navigate through pages of information—commonly known as browsing or surfing the Internet.

Each time one of the hypertext or hyperlinks is selected, the new content is downloaded into the current window. Depending on the network bandwidth, this may cause a brief to extensive delay. For convenience, additional windows may be opened to view multiple web pages. However, after opening several web pages, each in its own window, the taskbar may become quite cluttered. This makes it difficult to re-locate a particular web page. Tabbed browsers have been introduced to help manage the viewing of multiple web pages.

Tabbed browsers load web pages in "tabs" within the same browser window. Therefore, only one item appears on the taskbar, even though multiple web pages are loaded. Clicking on a hyperlink results in the web page being downloaded in the background into another tab. This allows a user to continue viewing the current web page without automatically switching to the other web page. When the web page is finished loading, the user may click on the associated tab and view that web page. Tabbed browsing makes it easier and more convenient to view multiple web pages.

The present mechanism further enhances the tabbed-browsing experience.

SUMMARY

The techniques and mechanisms described herein are directed to a method for pinning a tab in a tabbed browser. Briefly stated, browsing software is configured to recognize a "pin" event, such as a hot key, a menu selection, and the like. Upon recognizing the pin event, the browsing software splits a display screen into a pinned window and a tabbed window. The tabbed window displays one or more open tabs and the content of the currently in focus tab. The pinned window may display content that was previously displayed within one of the tabs in the tabbed window or may display new content. The browsing software may configure the navigation of the pinned window differently than the navigation for the tabs in the tabbed window. The pinned window provides a convenient way to compare multiple web sites, review content identified within in search, and the like.

BRIEF DESCRIPTION OF THE DRAWINGS

Non-limiting and non-exhaustive embodiments are described with reference to the following figures, wherein like reference numerals refer to like parts through-out the various views unless otherwise specified.

DETAILED DESCRIPTION

Briefly, the techniques and mechanisms described herein are directed to a method for pinning one of the tabs within a tabbed window displayed by a browser. The pinned tab may then be utilized as a hub for selecting news articles, as a search page for selecting additional sites, as a comparison page for comparing information from other sites, and the like. The following discussion describes the pinning mechanism within a browser that supports tabbed-heterogeneous windows. However, after reading the following description, one skilled in the art could incorporate a pinning mechanism into other types of tabbed browsers. As will be described in more detail below, the present tab-pinning mechanism provides a convenience that was unavailable until now.

Exemplary Computing Environment

Figure 1:
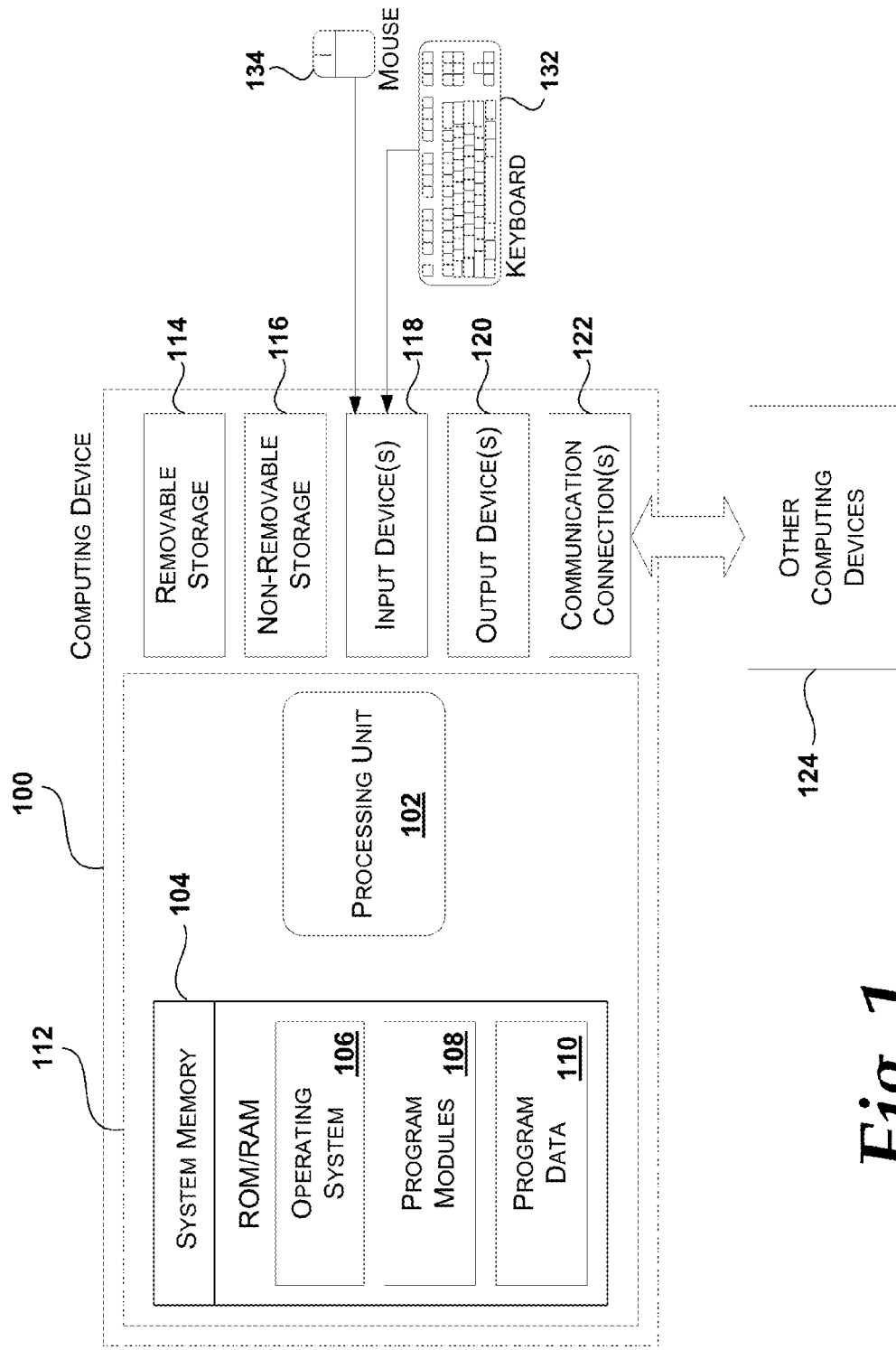
FIG. 1 is an illustrative computer environment that may be used to implement the techniques and mechanisms described herein.

The various embodiments of the tab-pinning mechanism may be implemented in different computer environments. The computer environment shown in FIG. 1 is only one example of a computer environment and is not intended to suggest any limitation as to the scope of use or functionality of the computer and network architectures. Neither should the computer environment be interpreted as having any dependency or requirement relating to any one or combination of components illustrated in FIG. 1.

With reference to FIG. 1, one exemplary system for implementing a tab-pinning mechanism includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 106, one or more program modules 108, and may include program data 110. This basic configuration is illustrated in FIG. 1 by those components within dashed line 112.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 114 and non-removable storage 116. Computer storage media may include volatile and nonvolatile, removable and non-removable media implemented in any method or technology for storage of information, such as computer-readable instructions, data structures, program modules, or other data. System memory 104, removable storage 114 and non-removable storage 114 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 118 such as keyboard 132, mouse 134, pen, voice input device, touch input device, etc. Output device(s) 120 such as a display, speakers, printer, etc. may also be included. These devices are well know in the art and need not be discussed at length here.

Computing device 100 may also contain communication connections 122 that allow the device to communicate with other computing devices 124, such as over a network. Communication connection(s) 122 is one example of communication media. Communication media may typically be embodied by computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

Exemplary Architecture

Figure 2:
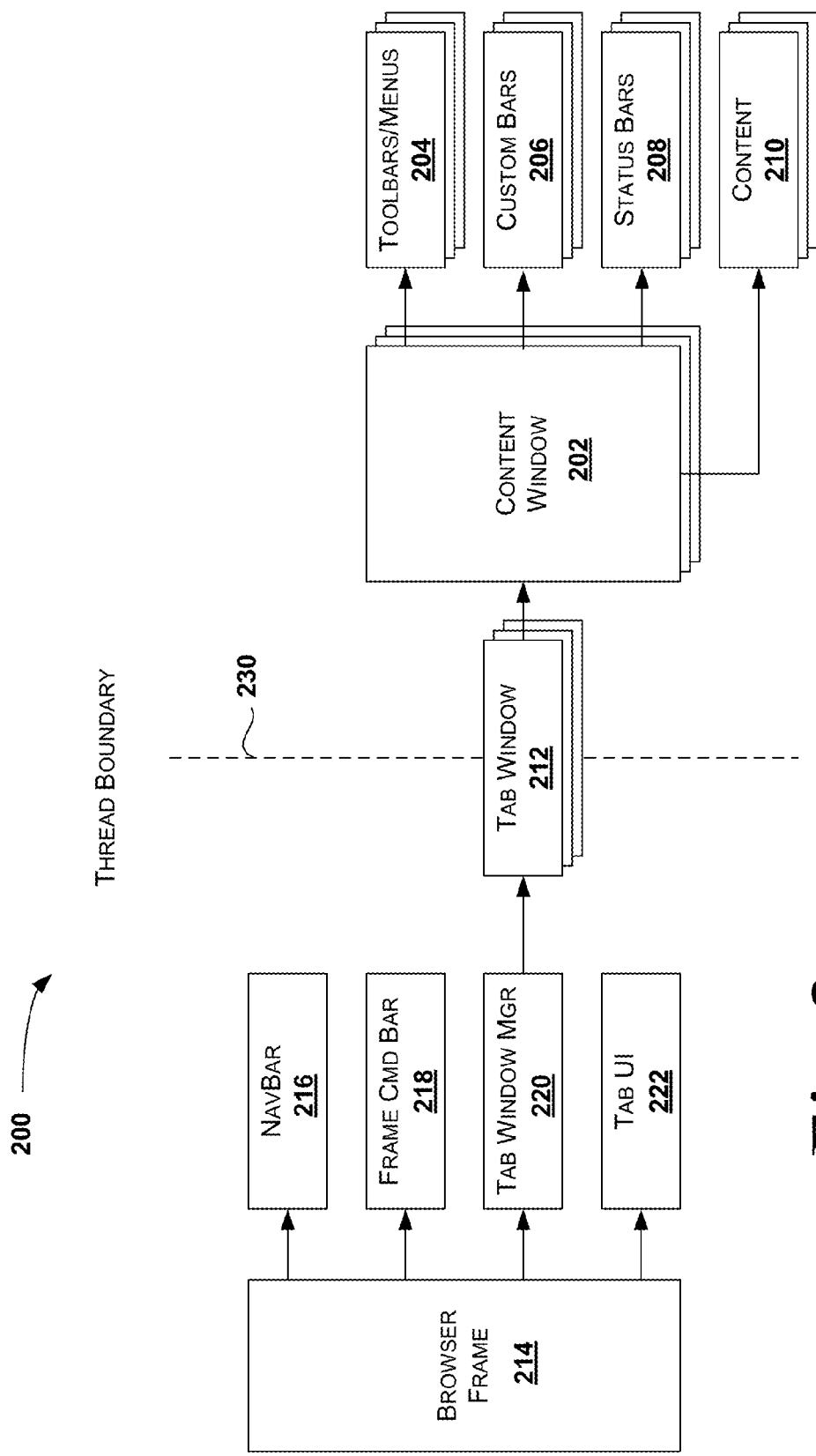
FIG. 2 is a block diagram illustrating one embodiment of an architecture for implementing tabbed browsing having a tab-pinning feature as described herein.

FIG. 2 is a block diagram illustrating one embodiment of an architecture 200 for implementing the tab-pinning mechanism as described herein. Architecture 200 includes one or more content windows 202. The content window may be a web browser, a shell view, a word processing application/document, a spreadsheet application/document, a presentation application/document, a document viewer, or the like. Each content window 202 is associated with its own toolbars/menus 204, custom bars 206, status bars 208, and content 210, as needed. For example, custom bars may include bars created to operate with search engines and the like. As mentioned earlier, in traditional browsers, each browser window consumed space on a taskbar. Once a number of browser windows were opened, the taskbar became very cluttered. For the present tabbed browser, a tab window manager 220 handles all the content windows 202 via their respective tab window 212. The tab window manger 220 communicates with a browser frame 214. In addition, browser frame 214 communicates with a navigation bar 216, a frame command bar 218, and a tab user-interface 222. Each of these components will be described below in more detail after describing thread boundary 230.

Thread boundary 230 represents a boundary between a single thread (i.e., a frame thread) that handles the processing for the components shown to the left of thread boundary 230 and multiple threads that handle the processing for the components on the right of thread boundary 230. Each instance of content window 202 is associated with at least one of its own threads. That thread also handles the processing for the associated toolbars/menus 204, custom bars 206, status bars 208, and content 210.

By having multiple threads, at least one for each content window 202, the architecture prevents a potential bottleneck caused by having only one thread handle the messages for all HTML rendering across the multiple tabs. In addition, having multiple threads reduces the likelihood of unnecessary delays or timeouts when downloading web pages. Having multiple threads also makes the architecture more resilient because if a tab hangs, only one tab hangs instead of potentially hanging all of the tabs. This is in contrast with other tabbed browsers that host their tabs on a single UI thread. In these tabbed browsers, the entire application hangs when a single tab is blocked. Each individual thread may be prioritized.

Each of the components in architecture 200 is now described. As mentioned above, each content window 202 is associated with its own toolbars/menus 204, custom bars 206, status bars 208, and content 210, as needed. For example, if there are five tabs open, five instances of each add-on (e.g., custom bar, toolbar, etc) are created and hooked to their own content. Similarly, if menus or status bars are modified via internal logic, HTML, document hosting, add-ons, or the like, the menu or status bar associated with that content window 202 is changed. The add-ons and the content window 202 operate in a well know manner. Because the add-ons do not know about tabs, the architecture 200 does not modify the operation between the add-ons and the content window. Instead, the architecture wraps each set of content windows into one browser frame 214. While not shown, there may be multiple browser frames 214, each with a set of tabbed-heterogeneous windows.

Content window 202 maintains state for the content window, such as size, position, visibility of frame elements, and the like. The state may be persisted into a stream when the tabbed browser closes, and then may be read when a new content window is launched. Alternatively, the state may be saved in a registry and read from the registry when the new content window is launched.

The tab window 212 lives on the frame thread. Each tab window 212 is configured to manage communication between the outer frame components (e.g., navigation bar 216, browser frame 214, etc) and an individual tab. The tab window 212 holds pointers to its associated content window 202 and interfaces so that it can manage cross-thread communication between the outer frame components and the individual content window 202. The cross-thread communication may involve cross-thread calls. In one embodiment, calls from the browser frame 214 to the content window 202 may be asynchronous. The tab window 212 is then responsible for marshalling the parameters and posting a message to the main window of content window 202. In contrast, calls from the content window 202 to the frame browser 214 may be synchronous. The tab window 212 is then responsible for marshalling the interfaces of the corresponding tab window 212. The tab window 212 may also convert synchronous calls into asynchronous calls in order to reduce the likeliness that a tab will hang.

The tab window 212 may also cache a limited amount of state. This allows the tab window to provide a quick synchronous lookup of state to other components. When the tab window 212 receives an event from the content window 202 that modifies the state, the tab window propagates these events up to the tab window manager 220.

In addition, the tab window 212 exposes several operations that can be performed on a tab, such as destroy, set visibility, set size, set position, and order. The tab window 212 also exposes operations that the frame needs for asynchronously invoking a tab. These operations may be exposed via individual application programming interfaces (API) or through a generic API. For the present tab-pinning mechanism, each tab window 212 may have its own set of characteristics. For example, one of the tab windows may be a pinned window which has a slightly different navigation characteristic than other tabbed windows. The navigation characteristic for the pinned window may drive one of the other tabbed windows instead of refreshing itself when a link is activated on the page within the pinned window.

The tab window manager 220 hosts multiple content windows 202 via multiple tab windows 212. The tab window manager 220 manages the overall state of each of the tabs. The state may include: a top level URL; a page title; a back/forward button availability; a favorite icon for the current page, a progress state for the current page, security information reflected in the user-interface (e.g., HTTPs info); and the like. The tab window manager 220 may synchronously query the tab window 212 for per-tab data. In addition, the tab window manager 220 manages the operations performed on the tabs, such as open, close, select, move, set size, set position, set order, and the like. This is achieved by accessing the operations exposed via the tab window 212.

The browser frame 214 hosts the navigation bar 216, frame command bar 218, tab window manager 220, and the tab UI 222. The browser frame 214 may also directly or indirectly host a rebar control (not shown). The browser frame 214 brokers communication between these hosted components.

The tab UI 222 is configured to render the user-interface for the collection of tab windows 212. In addition, the tab UI 222 controls the rectangle for the tabs' browser region. Tab UI 222 receives events from tab window manager 220 via browser frame 214. The events pertain to the tabs being managed by tab window manager 220. The events include an "OnTabListChanged" event, an "OnTabChanged" event, an "OnTabPinned" event, and the like. The "OnTabListChanged" event is sent by tab window manager 220 when changes are made to a collection of tabs (e.g., Open, Close, Reorder, etc). The "OnTabPinned" event is sent by tab window manager 220 when a tab has been pinned. The "OnTabChanged" event is sent by tab window manager 220 when a single tab changes (e.g., progress, title, URL). The corresponding tab window 212 sends a notification to tab window manager 220 which forwards the notification to tab UI 222. The notification identifies the tab. This method of communication keeps the communication serialized. In an alternate embodiment, individual tab windows 212 may directly call into tab UI 222. In addition, there may be multiple tab UI 222 components, each one handling the same set of tabs, but for a different location on the user-interface. For example, one tab UI may handle a tab row along the top of the display and another tab UI may handle a tab listview along the side of the display.

The frame command bar 218 provides a set of commands that have been determined to be the most useful to the tabs. By having this set of commands readily available for any tab, a user can conveniently locate one of the commands for any tab.

Exemplary User-Interface

Figure 3:
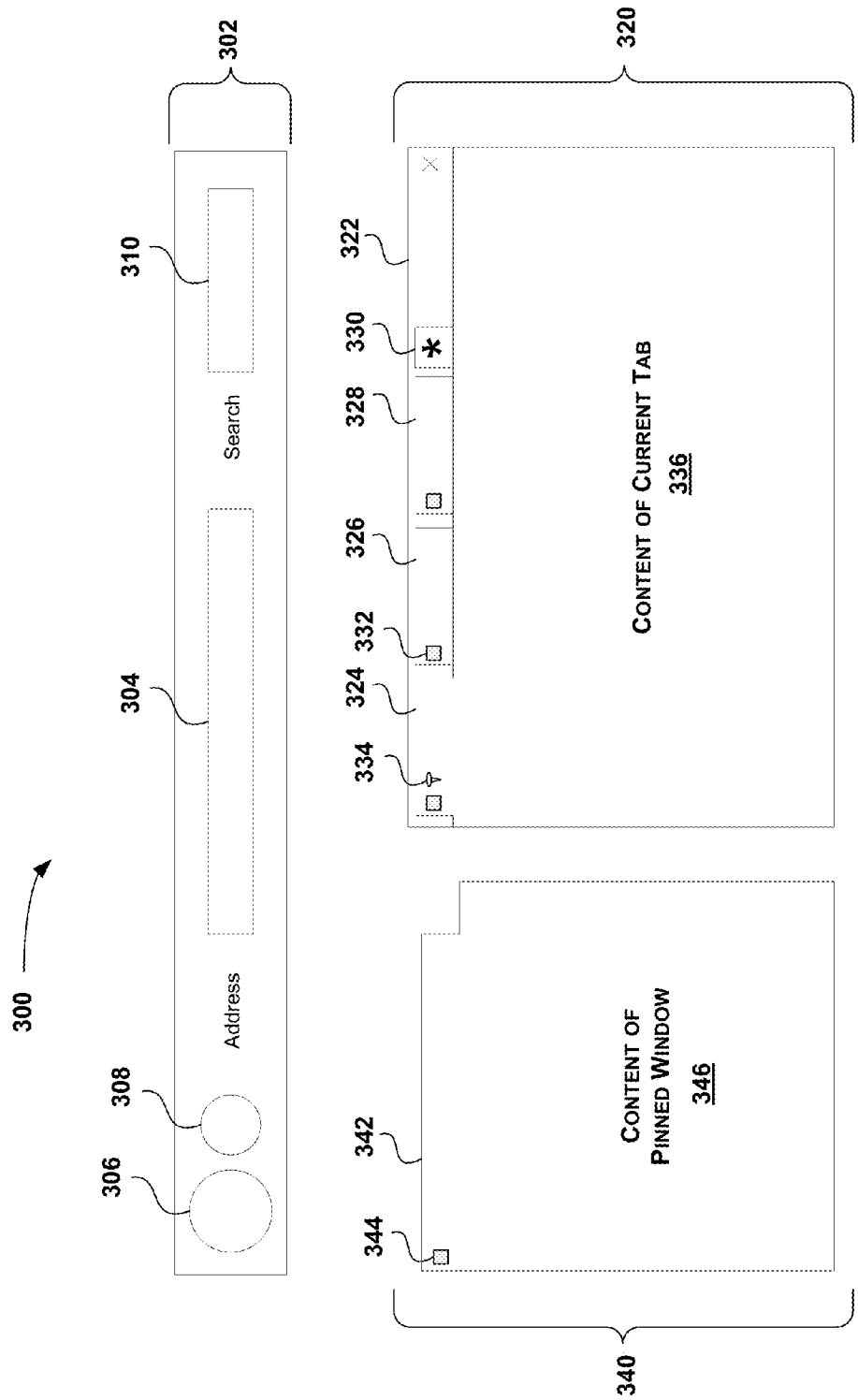
FIG. 3 is a display illustrating one embodiment of a user-interface that supports the tab-pinning feature in a tabbed browser.

FIG. 3 is one embodiment of a display illustrating a user-interface 300 that supports pinning tabs as implemented within a tabbed browser. User-interface 300 illustrates salient portions of a tabbed browser that implements the present tab-pinning mechanism. Those skilled in the art will appreciate that optional third party toolbars (not shown), a page space control (not shown), a status bar (not shown) and/or custom bars (not shown) may also be included within user-interface 300 without departing from the present tab-pinning mechanism. As shown, user-interface 300 includes a navigation bar 302, a pinned window 340, and a tabbed window 320.

The tabbed window 320 includes, a tab band 322, one or more tabs (e.g., tabs 324, 326, and 328), and content 336 associated with the tab currently in focus (e.g., tab 324 shown in FIG. 3). Each of the tabs 324, 326, and 328 may include a close box (e.g., close box 332) for closing the respective tab. In addition, tabbed window 320 may include a new tab 330 for creating a new tab within the tabbed window 320. As additional tabs are opened, the visible portion of each tab is reduced to accommodate the additional tabs.

In accordance with the present tab-pinning mechanism, the tabbed browser provides a mechanism for signaling a pin-tab event. The mechanism may be a pin icon 334, a context menu selection (not shown), and/or the like on the user-interface 300. The mechanism may also be a hot key (not shown) entered through a keyboard. Upon receiving the pin-tab event, the tabbed browser splits the display to accommodate the addition of a pinned window 340 to an existing tabbed window 320. The tabbed browser software may reduce the size of the tabbed window 320 to accommodate the pinned window 340.

The pinned window 340 includes a pinned tab 342 and pinned content 346 associated with the pinned tab 342. In addition, the pinned window 340 may include a pin close box 344 for the pinned tab 342. When the pin close box 344 is selected, the pinned window 340 may close so that only the tabbed window 320 remains on the display. However, before closing the pinned tab 342, the pinned tab 342 and the pinned content 346 may be transferred to a new or existing tab within the tabbed window. This allows the pinned content 346 to still be available for other purposes.

The navigation bar 302 may include an address bar 304, a back button 306, a forward button 308, and a search box 310. The content of the address bar 304 may be maintained for each tab. Thus, when "clicking" through the tabs 324, 326, and 328, the address bar 304 may display the address for the currently selected tab (i.e., the tab in focus). When the tab band 322 is in focus, the back button 306 may change the selected tab to be the tab to the left of the currently selected tab in the tab row. The forward button 308 may change the selected tab to be the next tab in the tab row moving to the left. The search box 310 allows text to be entered and searched for in the currently selected tab. One will note that the content of the address bar 304 may depend on whether the tabbed window 320 or the pinned window 340 is in focus. When the pinned window 340 is in focus, the address bar 304 may display the address for the content in the pinned window. Likewise, the back button 306 and the forward button 308 may depend on whether the tabbed window 320 or the pinned window 340 is in focus. When the pinned window 340 is in focus, the back button 306 and the forward button 308 may be used to view previous web pages that were visited.

In one embodiment, items in the user-interface 300 that are per frame include the navigation bar 302, the tab band 322, and the pinned window 340. Items in the user-interface 300 that are per tab include content 336. Interestingly, in one embodiment, content 336 may include different type of data sources. For example, content 336 may be a web page, a shell folder, a navigation based application, and the like. This heterogeneous content may be hosted in a single frame. In another embodiment, the content 336 associated with each tab may all be web pages.

Figure 4:
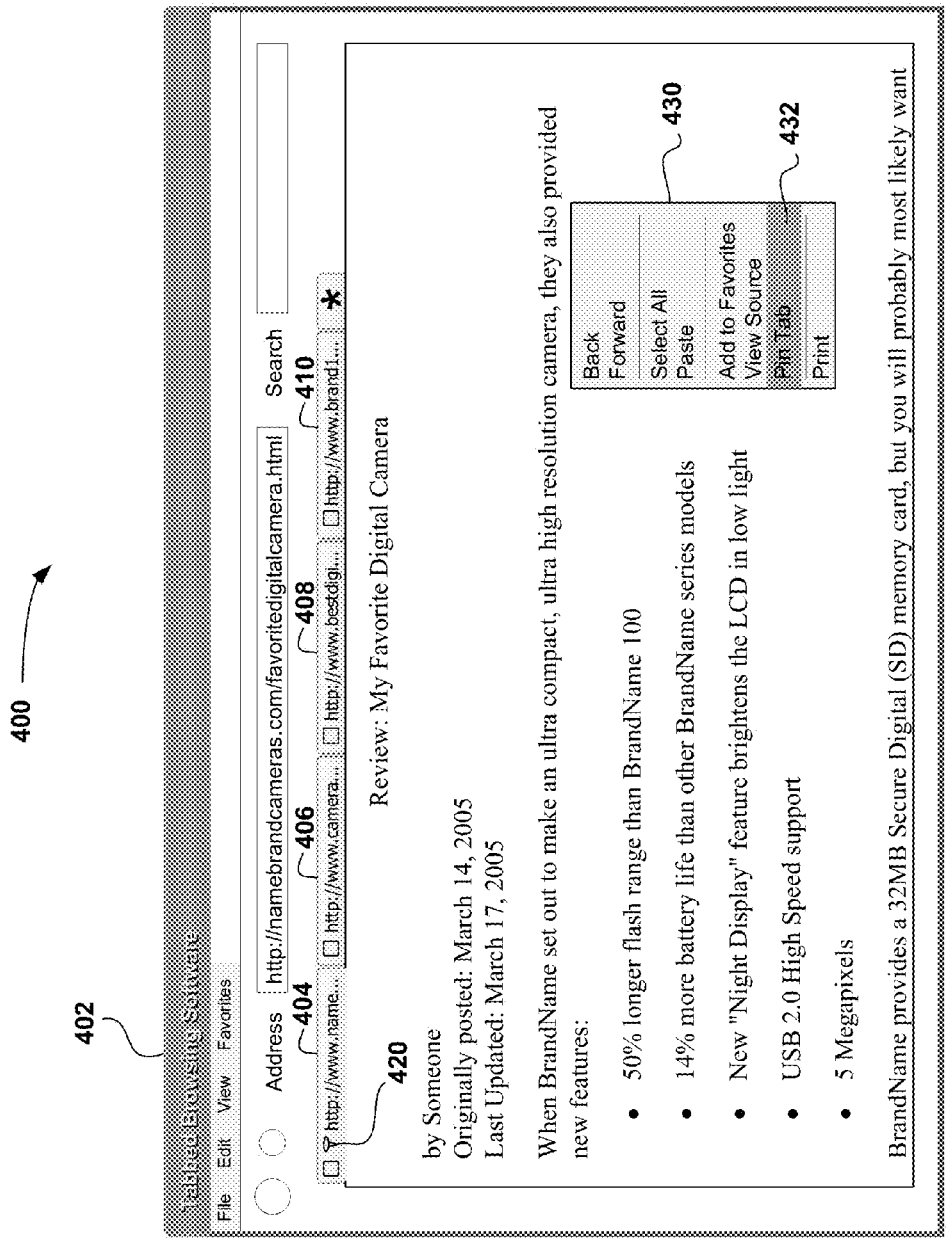
FIG. 4 is a display illustrating different entry points for the tab-pinning feature.
Figure 5:
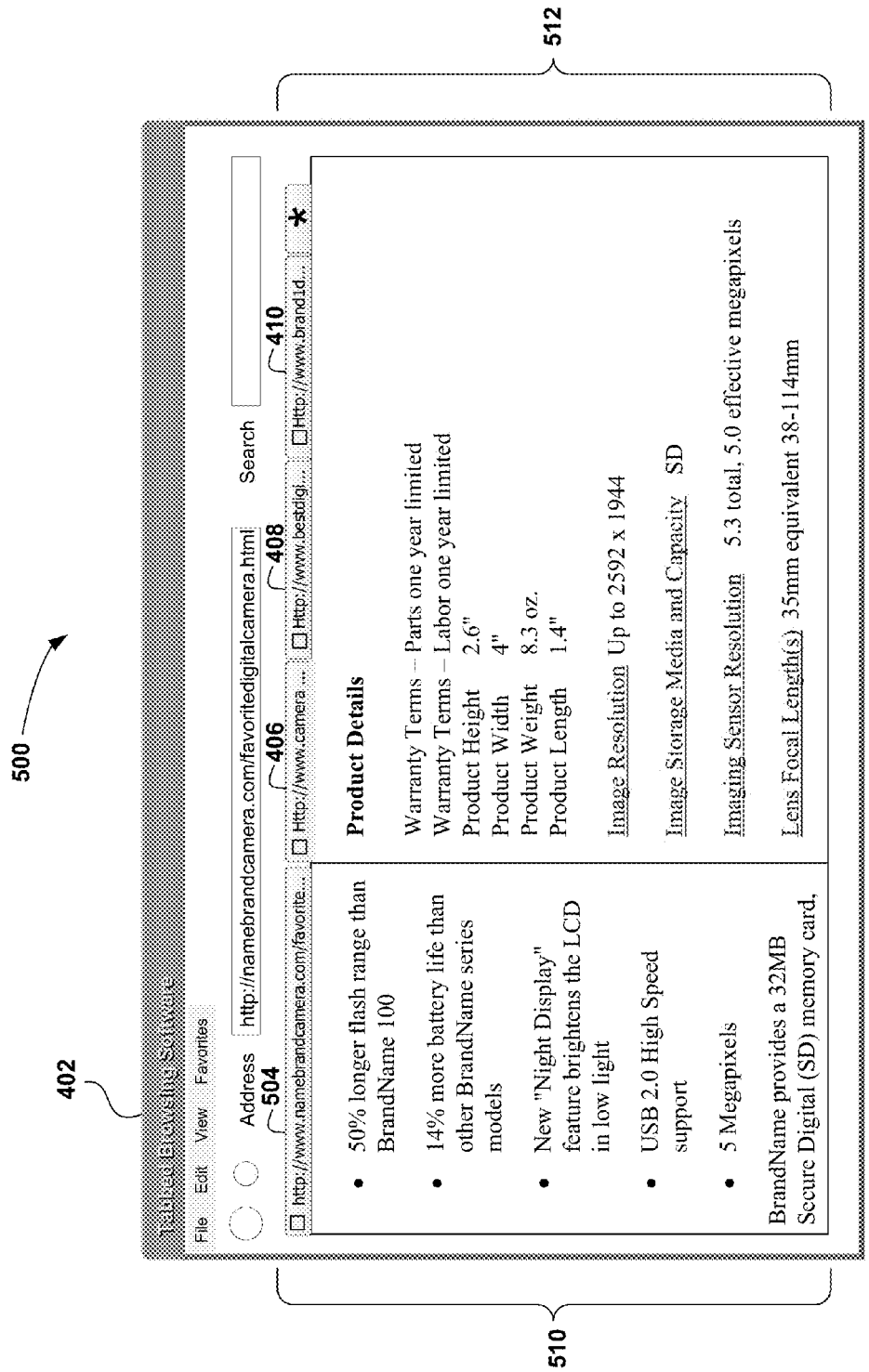
FIG. 5 is a display illustrating the use of a pinned tab in a comparison scenario.
Figure 6:
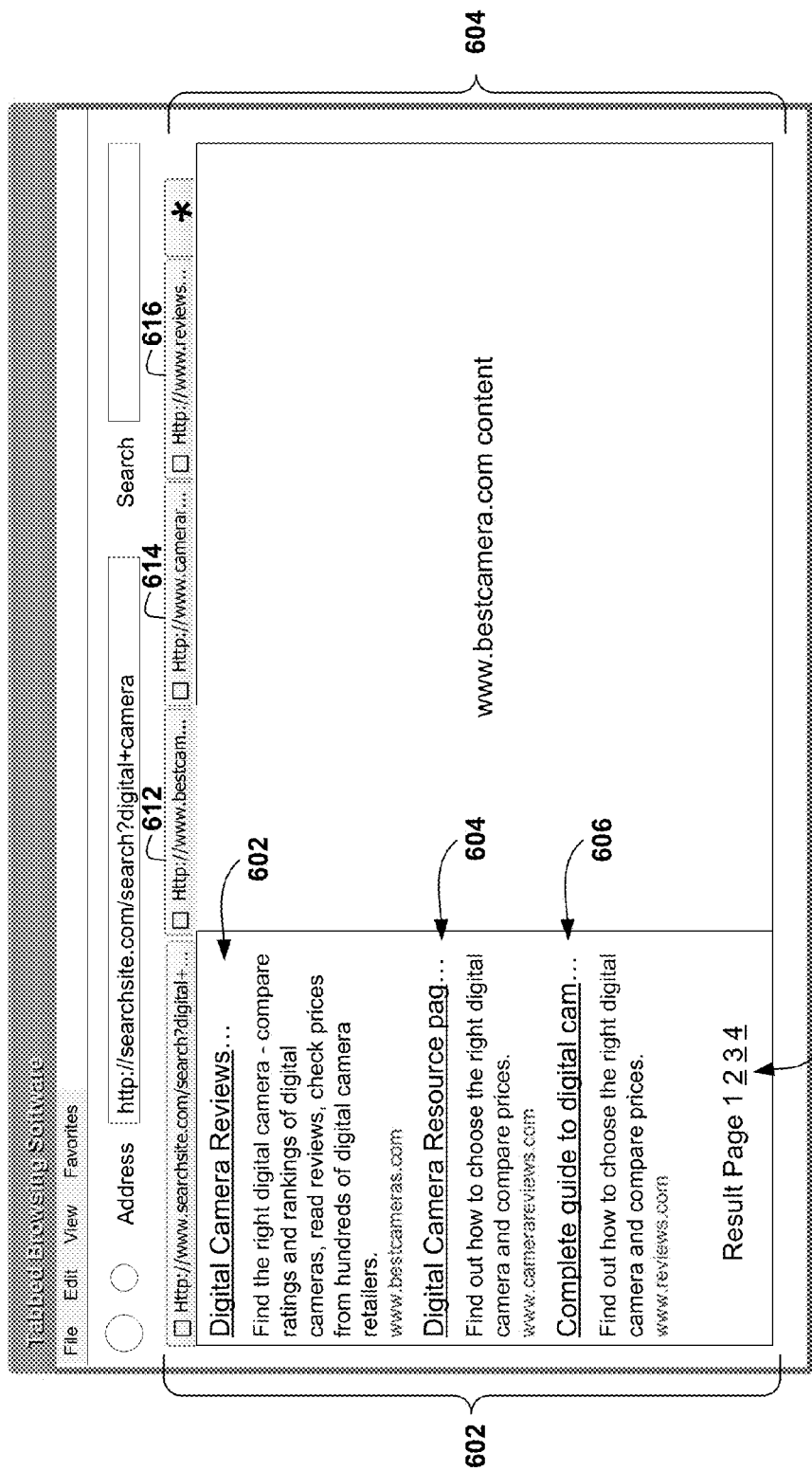
FIG. 6 is a display illustrating the use of a pinned tab in a search scenario.

The present tab-pinning mechanism provides a great convenience in many different scenarios. FIGS. 4-6 illustrate two scenarios in which a user may utilize the present tab-pinning mechanism. The first scenario (FIG. 4-5) is when a user wishes to compare items from different web pages. In the past, in order to achieve this, the user would have had to open several windows and then position each one in a desirable configuration for viewing and comparing. FIG. 6 illustrates a search scenario where a user performs a search and selects the desired web pages from the list of returned web pages. In the past, when one of the desired web pages was selected from the list, the search page would have been replaced with the content from the desired web page. The user would then have to navigate back to the search page to select another desired link.

FIG. 4 is a display 400 illustrating different entry points for creating a pinned tab. A user uses tabbed browsing software 402 to view (or "surf") various content on the Internet, local network, local computer, and the like. The user places the content of interest into one or more tabs (e.g., tabs 404-412). In the example shown, the user has visited several websites to learn about different types of digital cameras. The user now wishes to compare the different types of cameras with each other. The user may put the tab that describes the user's favorite digital camera in focus (e.g., tab 404 in focus) by selecting the associated tab. The user may then initiate the present tab-pinning mechanism through one of several entry points. One entry point is via the user's selection of the pin icon 420. Another entry point may be via the user's selection of a pin tab menu selection 432 from a context menu 430. Still another entry point may be via the user's entry of a hot key/hot key sequence on a keyboard. These and other entry points initiate the tab-pinning mechanism by signaling a pin-tab event to the tabbed browsing software.

FIG. 5 is a display 500 illustrating the result when the pin-tab event is received. Continuing with the comparison scenario, the tab that was in focus when the tabbed browsing software received the pin-tab event, is transferred to the pinned window 510. Thus, tab 404 shown in FIG. 4 is now pinned tab 504 within the pinned window 510. The content of the user's favorite digital camera review is "pinned" in pinned window 510. The user can now click the other tabs 406-410 within the tabbed window 512 to easily compare their respective content with the pinned content. One will note that even though tab 404 is shown removed from the tabbed window 512, in another embodiment, tab 404 may remain available in tabbed window 512. This embodiment allows the user to compare different portions of the same content.

FIG. 6 is a display 600 illustrating the use of a pinned tab in a search scenario. The entry point for the tab-pinning mechanism in this search scenario may be based on a specific user action, such as entering a search request within a search engine. For this embodiment, the tabbed browser software is configured to recognize this specific user action and to split the display into a pinned window 602 and a tabbed window 604. The tabbed browser software is further configured to display the results of the search in the pinned window 602. The tab window 604 may be initially empty or may contain existing tabs that were open in the tabbed window when the search was initiated. The tabbed browsing software may also be configured to modify the navigation characteristic of the pinned window 608 so that links (e.g., links 602, 604, and 606) within the pinned window 602 drive tabs within the tabbed window 604. For example, selection of link 602 may create a new tab 612 with the content associated with link 602. Likewise, selection of link 604 and 606 may create new tabs 614 and 616, respectively. The tabbed browsing software may also be configured to allow links (e.g., link 608) that target themselves to update the pinned content with new content. Thus, in the search scenario, when the link associated with the second page of results is selected (link 608), the pinned content for the first page of results is replaced with the second page of results.

Figure 7:
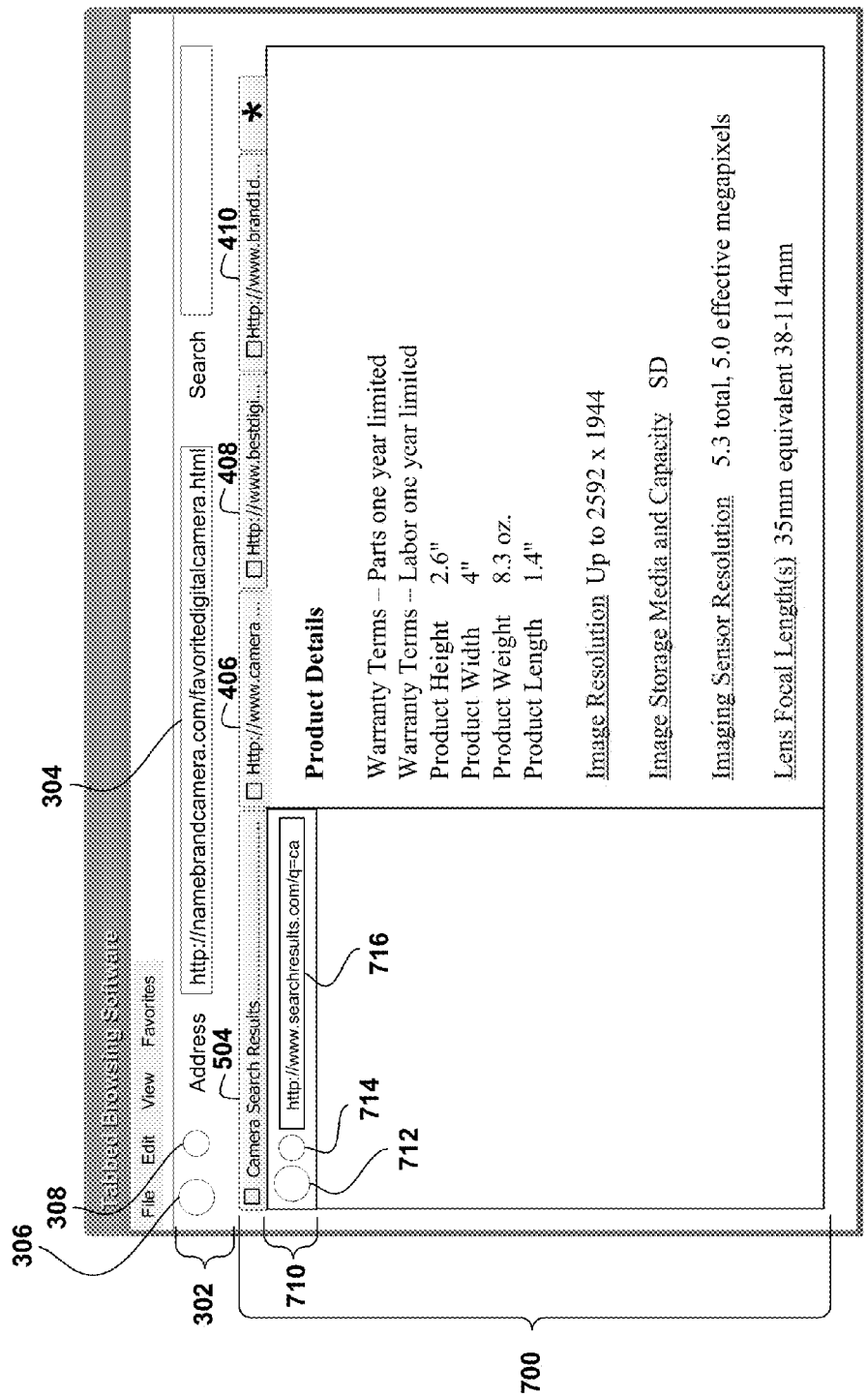
FIG. 7 is a display illustrating a mini-navigation bar associated with the pinned tab.

FIG. 7 is a display illustrating a mini-navigation bar 710 associated with a pinned tab. For this embodiment, the pinned window 700 includes the mini-navigation bar 710. The mini-navigation bar 710 includes a mini-back button 712, a mini-forward button 714, and a mini-address 716. The mini-navigation bar 710 allows the tab to be navigated using those controls. The operation of the controls are similar to the operation of the back button 306, the forward button 308, and the address 304 when the pinned tab is in focus. However, the mini-navigation bar 710 may provide a more convenient method for navigating within the pinned window because the user does not need to keep changing the focus between the tabbed window and the pinned window.

Exemplary Operation

Figure 8:
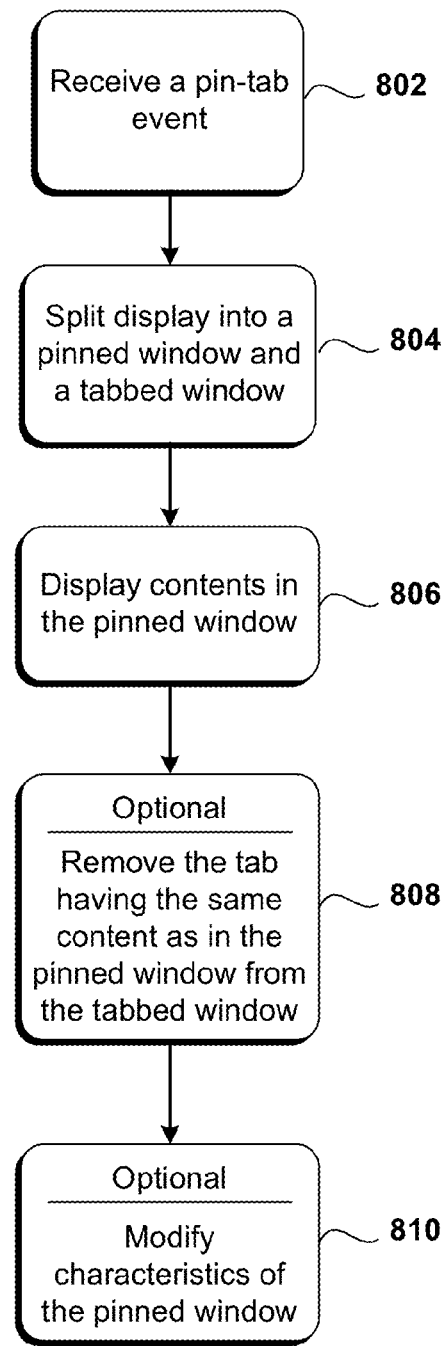
FIG. 8 is an operational flow diagram generally illustrating a process for displaying a pinned tab within a tabbed browser display.

FIG. 8 is an operational flow diagram generally illustrating a process for displaying a pinned tab within a tabbed browser display. The process 800 may be implemented on a computing device, such as computing device 100. The process 800 may be implemented within operating system 106, as one or more program modules 108, or in a combination of the two. The process begins at step 802 where tabbed browsing software receives a pin-tab event. As described above, the pin-tab event may be via a hot key entry, a selection of a pin icon, a selection of a menu item, initiation of a specific action, such as a search, or the like.

At step 804, the display is split so that there is a pinned window and a tabbed window. The split may allow half the display for the pinned window and the other half for the tabbed window. In another variation, the pinned window may have one-third of the display and the tabbed window may have two-thirds of the display. The split may occur vertically or horizontally. These and other variations are envisioned. However, it is desirable to split the display in a manner that allows the content of the pinned window to be easily viewed.

At step 806, the content for the pinned window is displayed. Depending on the pin-tab event, the content may be new content or may be existing content from one of the tabs within the tabbed window. For example, if there are several tabs open in the tabbed window, the content of the tab associated with the hot key may be displayed in the pinned window. However, if a search is initiated in one of the tabs in the tabbed window, the search results (i.e., new content) may be displayed in the pinned window.

At step 808, the tab in the tabbed window that has the same content as in the pinned window may be optionally removed from the tabbed window. This optional removal of the same content is especially desirable if a comparison is being performed between the pinned window and the other tabs in the tabbed window.

At step 810, the characteristics of the pinned window may be modified. For example, if the pinned window is used in a search scenario or a hub scenario, it may be desirable to have the navigation of the clicked links occur in the tabbed window rather than within the pinned window. In these scenarios, activating a link within the pinned window drives the creation of a new tab in the tabbed window that displays content associated with the activated link. However, the pinned window may allow a specific link that targets itself to update the pinned window. For example, a search page may have one or more links to subsequent search pages. If a user selects one of these additional search pages, the new search page will replace the current search page in the tabbed window instead of opening a new tab in the tabbed window. Thus, in one embodiment, when the tabbed browsing software recognizes an anchor tag that has a target property that identifies itself as the target, the tabbed browsing software will navigate in place within the pinned window. The default navigation characteristic may be to re-direct the link to another tab within the tabbed window.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the present mechanism may be practiced without one or more of the specific details, or with other methods, resources, materials, etc. In other instances, well known structures, resources, or operations have not been shown or described in detail merely to avoid obscuring aspects of the present consistent visual appearance technique.

While example embodiments and applications have been illustrated and described, it is to be understood that the present technique is not limited to the precise configuration and resources described above. Various modifications, changes, and variations apparent to those skilled in the art may be made in the arrangement, operation, and details of technique disclosed herein without departing from the scope of the claimed invention.

What is claimed is:

1. A computer-implemented method for displaying content in tabbed browsing software, the method comprising:
    receiving by a browser frame of the tabbed browsing software, a pin-tab event in response to a user action, wherein the browser frame is separated from content windows by a thread boundary;
    in response to the pin-tab event received by the browser frame, splitting a display to simultaneously accommodate a pinned window directly adjacent to a tabbed window, the tabbed window displaying a plurality of tabs where each tab is associated with its respective content, the respective content being displayed when the corresponding tab is in focus; and
    displaying pinned content within the pinned window based on the pin-tab event.

2. The computer-implemented method of claim 1, wherein the pinned content is the content associated with the tab in focus.

3. The computer-implemented method of claim 1, wherein the user action comprises entry of a hot key.

4. The computer-implemented method of claim 1, wherein the user action comprises selection of a menu item.

5. The computer-implemented method of claim 1, wherein the user action comprises selection of a pin icon.

6. The computer-implemented method of claim 1, wherein the user action comprises entry of a search request to a search engine.

7. The computer-implemented method of claim 6, wherein the pinned content comprises results from the search request.

8. The computer-implemented method of claim 1, further comprising removing the tab from the tabbed window that has the same content as the pinned content.

9. The computer-implemented method of claim 1, further comprising modifying the characteristics of the pinned window.

10. The computer-implemented method of claim 9, wherein the characteristics of the pinned window related to navigation of links within the pinned window are modified in a manner such that activating a link within the pinned window drives one of the tabs within the tabbed window.

11. The computer-implemented method of claim 10, wherein the characteristics of the pinned window are further modified to allow a link that targets itself to update the pinned window when activated.

12. The computer-implemented method of claim 1, further comprising displaying a mini-navigation bar associated with the pinned window for navigation within the pinned window.

13. A computer-readable storage medium storing computer-readable instructions that are executable by one or more processors to cause a display to display content in a tabbed-browsing software, the instructions comprising:
    receiving by a browser frame of the tabbed browsing software, a pin-tab event in response to a user action, wherein the browser frame is separated from content windows by a thread boundary;
    in response to the pin-tab event received by the browser frame, splitting a display to simultaneously accommodate a pinned window directly adjacent to a tabbed window, the tabbed window displaying a plurality of tabs where each tab is associated with its respective content, the respective content being displayed when the corresponding tab is in focus; and
    displaying pinned content within the pinned window based on the pin-tab event.

14. The computer-readable storage medium of claim 13, wherein the pinned content comprises the content associated with the tab in focus.

15. The computer-readable storage medium of claim 13, wherein the user action comprises an entry of a hot key, selection of a menu item, selection of a pin icon, or entry of a search request in a search engine.

16. The computer-readable storage medium of claim 15, wherein the pinned content comprises results from the search request.

17. The computer-readable storage medium of claim 13, further comprising removing the tab from the tabbed window that has the same content as the pinned content.

18. The computer-readable storage medium of claim 13, further comprising modifying the characteristics of the pinned window related to navigation of links within the pinned window, the characteristic being modified in a manner such that activating a link within the pinned window drives one of the tabs within the tabbed window.

19. The computer-readable storage medium of claim 18, wherein the characteristics of the pinned window are further modified to allow a link that targets itself to update the pinned window when activated.

20. A system configured to pin tabs within a tabbed browser, the system comprising:
- a processor; and
- a memory into which a plurality of computer-executable instructions are loaded, the plurality of instructions performing a method comprising:
- receiving by a browser frame of the tabbed browser, a pin-tab event in response to a user action, wherein the browser frame is separated from content windows by a thread boundary;
- in response to the pin-tab event received by the browser frame, splitting a display to simultaneously accommodate a pinned window directly adjacent to a tabbed window, the tabbed window displaying a plurality of tabs where each tab is associated with its respective content, the respective content being displayed when the corresponding tab is in focus; and
- displaying pinned content within the pinned window based on the pin-tab event.

* * * * *